US 6,865,479 B2

(12) United States Patent
Chen et al.

(10) Patent No.: US 6,865,479 B2
(45) Date of Patent: Mar. 8, 2005

(54) PROGRAMMATICALLY CALCULATING PATHS FROM A SPATIALLY-ENABLED DATABASE

(75) Inventors: Feng-wei Chen, Apex, NC (US); Robert R. Cutlip, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 94 days.

(21) Appl. No.: 10/077,146

(22) Filed: Feb. 15, 2002

(65) Prior Publication Data

US 2004/0204838 A1 Oct. 14, 2004

(51) Int. Cl.[7] .............................................. G01C 21/32
(52) U.S. Cl. ..................... 701/209; 701/200; 701/201; 701/202; 701/205; 701/208; 701/210; 701/211; 73/178 R
(58) Field of Search ................................ 701/200–202, 701/205, 208–211; 73/178 R

(56) References Cited

U.S. PATENT DOCUMENTS

| | | | | |
|---|---|---|---|---|
| 5,657,231 A | * | 8/1997 | Nobe et al. ................. | 701/209 |
| 5,808,566 A | * | 9/1998 | Behr et al. ............. | 340/995.12 |
| 6,269,303 B1 | * | 7/2001 | Watanabe et al. ........... | 701/209 |
| 6,381,537 B1 | * | 4/2002 | Chenault et al. ............ | 701/209 |

OTHER PUBLICATIONS

IBM DB2 Spatial Extender, "User's Guide and Reference" Version 7, 1998.

* cited by examiner

Primary Examiner—William A. Cuchlinski, Jr.
Assistant Examiner—Olga Hernandez
(74) Attorney, Agent, or Firm—Gerald R. Woods; Marcia L. Doubet

(57) ABSTRACT

Technics are disclosed for programmatically calculating directions (or other types of paths between points) without reliance on proprietary file formats or binary shape files, and without requiring application programmers to write code that performs complex manipulations of directed graphs. Preferred embodiments leverage built-in functions of a spatially-enabled object relational database system. Information about intersections between streets is used in a novel manner to compute paths between points. The intersection information is preferably obtained from precomputed information stored in a spatially-enabled relational database table.

34 Claims, 10 Drawing Sheets

Intersection Table 210

| inter_id | street_id | intersect_id (stored as text string) | intersect_pt (multiple pts) |
|---|---|---|---|

City Table 220

| city_id | state_id | name | envelope | polygon |
|---|---|---|---|---|

State Table 230

| state_id | name | envelope | polygon |
|---|---|---|---|

Address Table 240

| addr_id | address | street_id | city_id | state_id | zip_id | PT<x,y> |
|---|---|---|---|---|---|---|

Street Table 250

| street_id | start_Pt | name | envelope | linestring | PointZM |
|---|---|---|---|---|---|

Points of Interest 270

| rid | type | name | phone |
|---|---|---|---|

Zip code Table 260

| zip_id | city_id | zipcode | envelope | polygon |
|---|---|---|---|---|

FIG. 3

| | |
|---|---|
| | 300 |
| 310 | 123 High House Rd, Apex, NC  27502 |
| 320 | 123 Hudson Rd, Raleigh, NC  28971 |
| 330 | 123 Davis Dr, Cary, NC  27676 |

Major Geometry Tables

FIG. 4

State Table 400

| state_id | abbr_name | name | envelope | polygon |
|---|---|---|---|---|
| 1 | NC | North Carolina | (b,b) | (p,p,p,p) |
| 2 | SC | South Carolina | (b,b) | (p,p,p,p) |
| 3 | VA | Virginia | (b,b) | (p,p,p,p) |

City Table 430

| city_id | state_id | name | envelope | polygon |
|---|---|---|---|---|
| 1 | 1 | Raleigh | (b,b) | (p,p,p) |
| 2 | 1 | Cary | (b,b) | (p,p,p) |
| 3 | 1 | Apex | (b,b) | (p,p,p) |
| 4 | 1 | RTP | (b,b) | (p,p,p) |
| 5 | 2 | Charleston | (b,b) | (p,p,p) |

Zip code Table 460

| zip_id | city_id | state_id | zipcode | envelope | polygon |
|---|---|---|---|---|---|
| 1 | 3 | 1 | 27502 | (b,b) | (p,p,p) |
| 2 | 1 | 1 | 27707 | (b,b) | (p,p,p) |
| 3 | 1 | 1 | 27560 | (b,b) | (p,p,p) |
| 4 | 4 | 1 | 27709 | (b,b) | (p,p,p) |

FIG. 5
Minor Geometry Tables

Address Table  500

| addr_id | address | street_id | city | state | zipcode | PT<x,y> |
|---|---|---|---|---|---|---|
| 1 | 123 High House Rd | 123 | Apex | NC | 27502 | <35.9,78.2> |
| 2 | 123 Hudson Rd | 456 | Raleigh | NC | 28971 | <34.567,78.3> |
| 3 | 123 Davis Dr | 789 | Cary | NC | 27676 | <45.789,78.9 |

Street Table  530

| street_id | start_Pt | name | envelope | linestring | Point_ZM |
|---|---|---|---|---|---|
| 123 | <35.8,67.9> | High House Rd | (bounding box) | constructed when address inserted into table | <1,3,1,100><br>x=state_id<br>y=city_id<br>z=zip_id<br>M=density point |
| 456 | <35.67,67.85> | Hudson Rd | b.b | | <1,1,5,1> |
| 789 | <35.77,67.99> | Davis Dr | b.b | | <1,2,6,1> |

Intersection Table  560

| inter_id | street_id | intersect_id (stored as text string) | intersect_pt (multiple pts) |
|---|---|---|---|
| 1 | 123 | 456 | <35.66,78.92> |
| 2 | 456 | 123,789 | <35.66,78.92><br><36.88,78.92> |
| 3 | 789 | 456 | <36.88,78.92> |

PROGRAMMATICALLY CALCULATING PATHS FROM A SPATIALLY-ENABLED DATABASE

RELATED APPLICATIONS

The present invention is related to U.S. Pat. No. 6,658,356 (Ser. No. 10/077,547), entitled "Programmatically Deriving Street Geometry from Address Data"; U.S. patent Ser. No. 10/077,080, entitled "Programmatically Computing Street Intersections Using Street Geometry"; and patent Ser. No. 10/077,079, entitled "Adapting Point Geometry for Storing Address Density", each of which was filed concurrently herewith and which is hereby incorporated herein by reference. These patents are commonly assigned to the International Business Machines Corporation ("IBM"), and are referred to herein after as "the related inventions".

BACKGROUND OF THE INVENTION

1. Field of the Invention

The present invention relates to spatially-enabled computer databases, and deals more particularly with techniques for programmatically calculating paths between points using data stored in a spatially-enabled database.

2. Description of the Related Art

Geographic information systems are known in the art, and store geographic or cartographic (i.e. map-oriented) data. Systems are also known in the art for using relational databases to process (e.g. store and access) this type of geographic data. When a relational database is adapted for use with geographic information system ("GIS") data, the database is often referred to as "spatially-enabled".

Geographic data pertains to physical locations, and when using 2 dimensions, is typically expressed in terms of latitude and longitude. The latitude and longitude values for a particular location are given relative to fixed points of reference, using a coordinate system in which a latitude value represents an offset from the equator and a longitude value represents an offset from the prime meridian.

Geographic data may describe the physical location or area of a place or thing, or even the location of a person. When geographic data is stored in a spatially-enabled database, it is stored using a geometric model in which locations/areas are expressed in terms of geometric shapes or objects. The geometric data stored according to this model may also be referred to as "spatial data". In addition to locations or areas of geographic objects, spatial data may also represent relationships among objects, as well as measurements or distances pertaining to objects. As an example of relationships among objects, spatial data may be used to determine whether a geometric shape corresponding to the location of a particular bridge intersects a geometric shape corresponding to the location of a river (thus determining whether the bridge crosses the river). As an example of using spatial data for measurements or distances, the length of a road passing through a particular county could be determined using the geometric object representing the road and a geometric object which specifies the boundaries of the county.

Spatial data values are expressed in terms of "geometry" or "geometric" data types. Thus, the location of a landmark might be expressed as a point having (x,y) coordinates, and the perimeter of a lake might be defined using a polygon. Typical spatially-enabled database systems support a set of basic geometry data types and a set of more complex geometry data types, where the basic types comprise points, line strings, and polygons, and the complex types comprise collections of points, collections of line strings, and collections of polygons.

A common geometric model used by spatially-enabled database systems is shown in FIG. 1. As shown therein, the model is structured as a hierarchy or tree 100 having geometry 105 as its root, and having a number of subclasses. Point 110, linestring 120, and polygon 130 represent the basic geometry data types. In this model 100, linestring 120 is a subclass of curve 115, and polygon 130 is a subclass of surface 125. Geometry collection class 135 is the root of a subtree representing the more complex geometric data types, and each subclass thereof is a homogeneous collection. Multipolygon 145, multistring 155, and multipoint 160 represent the collections of polygons, line strings, and points, respectively. Multipolygon 145 is a subclass of multisurface 140 in this model, and multistring 155 is a subclass of multicurve 150. Only the classes which are leaves of this tree 100 are instantiable in typical spatially-enabled database systems; the other nodes correspond to abstract classes. (Each of these entities is an actual data type.)

A Referring now to the basic data types in particular, geometric data according to the model 100 of FIG. 1 may be expressed in terms of a single point having (x,y) coordinates, or may be described as a line string or a polygon. A line string may be considered as one or more line segments which are joined together, and is defined using an ordered collection of (x,y) coordinates (i.e. points) that correspond to the endpoints of the connected segments. A polygon is defined using an ordered collection of points at which a plurality of line segments end, where those line segments join to form a boundary of an area.

Many different examples may be imagined where points, line strings, and polygons can be used for describing locations or areas. A point might represent the location of a landmark such as a house or a building, or the intersection of two streets. A line string might be used to describe a street, or the path of a river or power line, or perhaps a set of driving directions from one location to another. A polygon might be used to describe the shape of a state or city, a voting district, a lake, or any parcel of land or body of water.

Once spatial information has been stored in a database, the database can be queried to obtain many different types of information, such as the distance between two cities, whether a national park is wholly within a particular state, and so forth.

Early geographic information systems relied on proprietary data formats. A widely popular example is the ".shp" shape format. These shape files contain binary data that may represent points, line strings, or polygons relating to geographic locations or areas. Another commonly-used proprietary data format is known as ".EDG". Files using EDG format contain binary data that provides a mapping between an address and its 2-dimensional geographic location. Efforts have been made in recent years to define open, standardized data formats for GIS data, in order to facilitate exchange of data between systems. This work is characterized by two data formats known as "well known text" and "well known binary", or simply "WKT" and "WKB". The Open GIS Consortium, Inc. ("OGC") is an industry consortium which promulgates standardized specifications including these data formats. The data formats are termed "well known" because they are standardized and therefore non-proprietary. Typical spatially-enabled database systems support one or more of these four data formats.

As one example of a spatially-enabled database, a feature known as "Spatial Extender" can be added to IBM's DB2® relational database product to provide GIS support. Spatial Extender provides support for the geometric data types shown in FIG. 1, and provides a number of built-in functions for operating on those data types. When using Spatial Extender, spatial data can be stored in columns of spatially-enabled database tables by importing the data or deriving it. The import process uses one of the WKT, WKB, or ".shp" shape formats described above as source data, and processes that data using built-in functions to convert it to geometric data For example, WKT format data may be imported using "geometryFromText" functions; similar functions are provided for WKB format data ("geometryFromWKB") and ".shp" shape data ("geometryFromShape"). Spatial data may be derived either by operating on existing geometric data (for example, by defining a new polygon as a function of an existing polygon) or by using a process known as "geocoding". A geocoder is provider with Spatial Extender that takes as input an address in the United States and derives a geometric point representation. Other geocoders can be substituted to provide other types of conversions.

Refer to "IBM®DB2® Spatial Extender User's Guide and Reference", Version 7.2, published by IBM in July 2001 as IBM publication SC27-0701-01, for more information on Spatial Extender. This User's Guide is hereby incorporated herein as if set forth fully, and is hereinafter referred to as the "Spatial Extender User's Guide". ("IBM" and "DB2"are registered trademarks of IBM.)

Another example of a spatially-enabled database is the IBM Informix® Spatial DataBlade® product. This database is described in "SDE Version 3.0.2 for Informix Dynamic Server, Spatial DataBlade Reference Manual", Spatial DataBlade also supports the geometric types shown in FIG. 1, and the WKT, WKB, and ".shp" shape formats. This Reference Manual is referred to hereinafter as the "Spatial DataBlade® Reference Manual". ("Informix" and "DataBlade" are registered trademarks of IBM.) geometric types shown in FIG. 1, and the , WKB, and ".shp" shape formats. This Reference Manual is referred to hereinafter as the "Spatial DataBlade® Reference Manual". ("Informix" and "DataBlade" are registered trademarks of IBM.)

While WKT is an open, interchangeable data format, it may be considered as a relatively "artificial" or "contrived" format for source data. That is, all geometric data that is expressed in WKT format must be specified using particular syntax conventions. To represent the point having an x-coordinate of 12 and y-coordinate of 25, commonly denoted as (12,25), for example, the following WKT syntax is used:

'point (12 25)'

Extensions have been defined to WKT and WKB formats for supporting 3-dimensional data—that is, allowing points to be expressed with a z-coordinate as well as x- and y-coordinates. (An extension is also defined for a fourth dimension, whereby measurement information can be added to a data value.) To express a 3-dimensional point in WKT format, a syntax that differs slightly from the 2-dimensional syntax is used. Suppose this 3-dimensional point has coordinates (12,25,55). The WKT representation of this point is then:

'point z (12 25 55)'

The syntax for line strings and polygons is similar to that used for points, yet is different in some respects. Given a square polygon having vertices at (0,0), (1,0), (1,1), and (0,1), the WKT representation is:

'polygon ((0 0, 1 0, 1 1, 0 1, 0 0))'

A detailed discussion of the WKT syntax, including syntax examples for each possible permutation of geometry type, may be found in "Appendix C, The well-known text representation for OGIS geometry", of the Spatial DataBlade® Reference Manual.

As will be readily apparent, this type of textual representation of geometric data does not naturally occur in textual documents; instead, geometric data must be specially adapted for, or converted to, this type of textual representation.

Techniques are known in the art for deriving information from GIS data in spatially-enabled databases, such as driving directions between one point and another point (e.g. between one street address and another street address). However, known solutions for deriving directions rely on proprietary address files and street shape files stored in binary format, where the street address files are typically "EDG" files and the street shape files typically use the "WKB" or ".shp" shape format. Relying on proprietary files and proprietary file formats has drawbacks which are evident. Furthermore, these types of files tend to be quite large, and therefore consume significant system resources. Applications which are known in the art for deriving directions from spatially-enabled databases use directed graphs, placing responsibility on the application programmer for providing complex logic to traverse the directed graphs when computing a solution. In addition to the added development expense which arises from this type of complex logic, with complex application program logic comes expensive support. Thus, what is needed is a solution which avoids the drawbacks of prior art techniques.

SUMMARY OF THE INVENTION

An object of the present invention is to provide improved techniques for deriving paths from spatially-enabled databases.

Another object of the present invention is to provide techniques for programmatically calculating paths between points without requiring EDG, WKT, WKB, or ".shp" shape input.

A further object of the present invention is to define techniques for tuning the path calculations using modifiable parameters.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for programmatically calculating a path between points using a spatially-enabled database. In a preferred embodiment, this technique comprises: identifying an origin and a destination; determining a first street on which the origin is located and a second street on which the destination is location; and computing a path from the origin on the first street to the destination on the second street using intersection data represented by street geometry data stored in the spatially-enabled database. The intersection data may be stored in a spatially-enabled table of the spatially-enabled database.

Computing the path preferably further comprises iteratively performing, until completing the path, operations of: computing a bounding box between the origin and the destination; computing a shortest linear path ("SLP")

between the origin and the destination; and selecting an intersection point closest to the SLP to replace the origin for subsequent iterations of the iteratively performed operations, wherein the path is complete when the street on which the origin is located intersects the street on which the destination is located.

The selecting operation preferably gives preference to intersection points located within the bounding box. In addition, the selecting operation may give preference to intersection points whose SLP is not longer than a quantified percentage more than the SLP between the origin on the first street and the destination on the second street. The selecting operation may also (or alternatively) give preference to intersection points whose bounding box is no more than a quantified percentage larger than the bounding box between the origin on the first street and the destination on the second street. The quantified percentage is a value that may be (for example) specified by a user or obtained from a configuration file.

The present invention may also be used advantageously in methods of doing business. For example, an implementation of the present invention may be used to provide services for performing path computations when supplied with locations of a desired origin and destination. Such services may, for example, be marketed as consumer subscription services or as pay-per-use services.

The present invention will now be described with reference to the following drawings, in which like reference numbers denote the sane element throughout

BRIEF DESCRIPTION OF THE DRAWINGS

FIG. 2 illustrates a spatial data mart schema, having tables and relationships which are created according to preferred embodiments of the related inventions;

FIG. 3 provides sample input data, for purposes of illustrating operation of preferred embodiments of the related inventions;

FIGS. 4 and 5 illustrate in more detail the individual tables of the spatial data mart, according to preferred embodiments of the related inventions;

DESCRIPTION OF PREFERRED EMBODIMENTS

Figure 1:
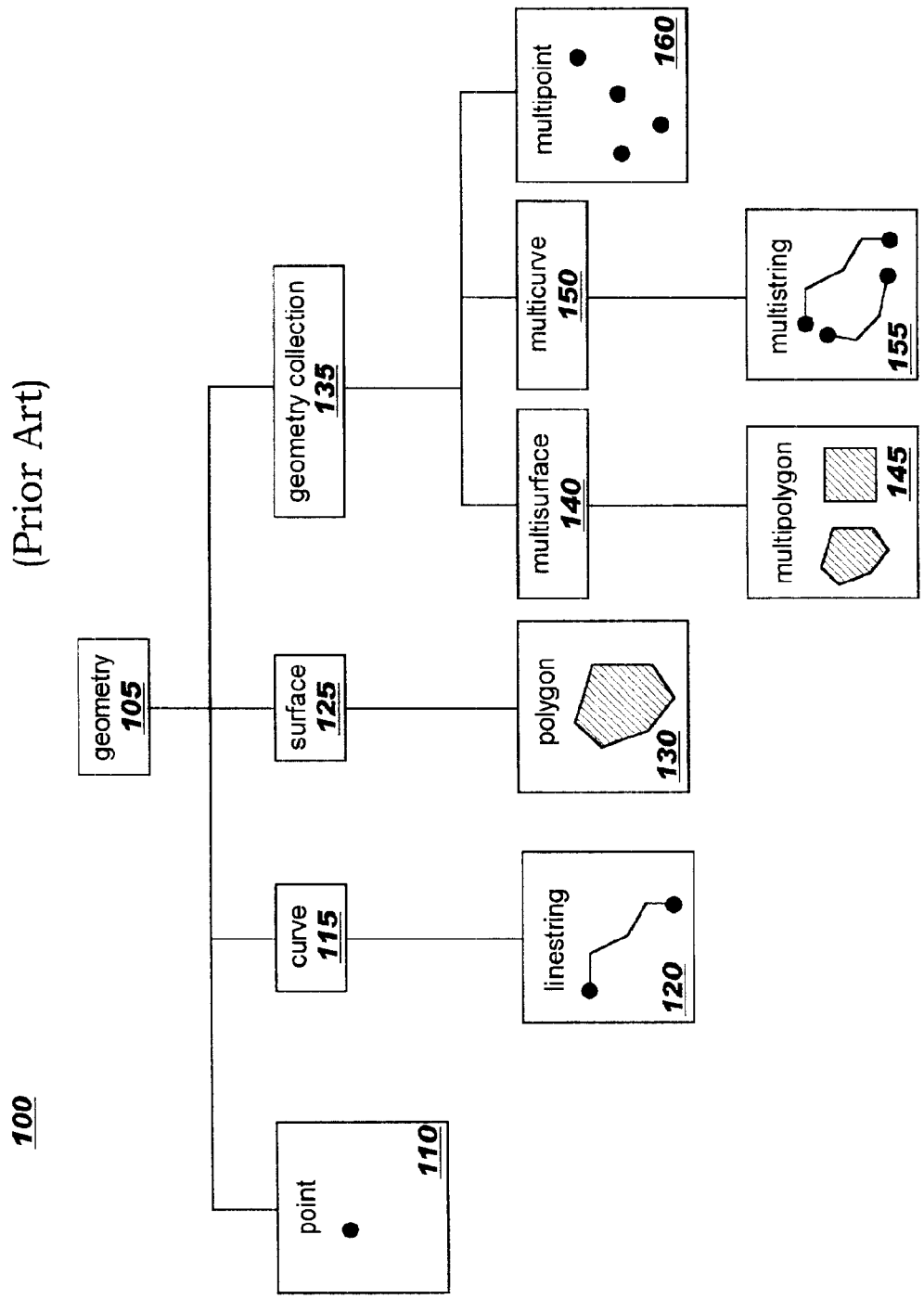
FIG. 1 illustrates a common geometric model used by spatially-enabled database systems, according to the prior art.

The present invention discloses techniques whereby data stored in a spatially-enabled database can be used to programmatically calculate directions (or other types of paths) between points without reliance on proprietary file formats or binary shape files. Preferred embodiments use an algorithm which does not require application programmers to perform complex manipulations of directed graphs. In contrast to prior art techniques, the address data is not required to be in WKT, WKB, or ".shp" shape form, and street addresses do not need to be looked up in proprietary "EDG" files; by avoiding a reliance on these file types, the amount of storage required may be greatly reduced, and information is more readily available. Preferably, the address data used by preferred embodiments of the present invention is obtained from a spatially-enabled database having tables which are populated according to the related inventions.

Using the spatially-enabled relational database of the related inventions for source data, the present invention's operations on that data can leverage the native data normalization and data management facilities provided by the database system. The spatial extensions, geometric data types, grid indexing functions, user-defined functions, and built-in procedures of the database system can also be leveraged to optimize operations on the tables created according to the related inventions, including the street table and the intersection table. The built-in relational database functions for querying tables and retrieving data therefrom and built-in spatial data functions for computing bounding boxes, in particular, may be leveraged by an implementation of the present invention. In this manner, operations on the stored data can use optimized built-in functions of the database system, rather than requiring an applications programmer to provide complex code in his/her application for interacting with street and intersection data As a result, programmer efficiency is increased and code complexity is reduced, thereby leading to decreased program development and support costs. Furthermore, use of the optimized built-in database functions for interacting with the stored data will typically increase the efficiency of application programs.

The technique which is disclosed for use in preferred embodiments may be characterized as a least-path computation which employs breadth-first searching with heuristics deepening. This technique will be described in detail below.

Preferred embodiments of the present invention are implemented in a DB2® object relational database system in which the Spatial Extender feature has been installed to provide spatial data support. Thus, references hereinafter to particular function names should be interpreted as references to DB2 and/or Spatial Extender functions unless otherwise noted. (When the present invention is implemented in another database system, functions providing analogous support may be substituted for the functions referenced herein without deviating from the scope of the present invention. Furthermore, it should be noted that while examples are provided herein using particular function names and syntax, these examples are merely illustrative.)

The tables created according to the related inventions are described in detail therein. Pertinent parts of that description are repeated herein.

Referring now to FIG. 2, a spatial data mart 200 is shown which is representative of a schema on which preferred embodiments of the related inventions may be modeled. In this data mart 200, each record (i.e. row) of an address table 240 contains address information, including pointers or references to/from several other tables. In the representative schema in FIG. 2, those other tables are an intersection table 210, a city table 220, a state table 230, a street table 250, and a zip code table 260. In addition, an optional enhancement of the related inventions may include one or more side tables, such as points of interest table 270. (Note that these side tables are not a requirement of the related inventions; thus, the dashed rectangle surrounding points of interest table 270 in FIG. 2 indicates that this is an optional table.)

FIGS. 4–5 illustrate the tables of the spatial data mart in more detail, and provide sample values. Suppose that the three records 310, 320, 330 shown in the sample input file 300 of FIG. 3 represent address data that is to be processed by the related inventions. Each record in this sample input file contains a street address, which includes both a number (i.e. an address of a location on the street) and a street name; a city name; a state name; and a zip code value. (An input file used by an implementation of the related or present inventions will typically contain many records, as will be obvious, even though only three records are shown in the sample input file.)

FIG. 4 provides sample values for the state table 400, city table 430, and zip code table 460. These tables correspond to tables 230, 220, and 260 of the spatial data mart schema illustrated in FIG. 2. Logic which may be used to populate tables 400, 430, 460 is described in the related inventions.

The state table 400 includes a row for each state having an entry in the address table 500, described below. Each row includes a unique index or key value ("state_id" in the example), which is commonly referred to as a primary key in relational database systems. (Techniques for generating a primary key for a database record are well known in the art. For purposes of describing the tables created by the related inventions, the primary keys in most tables are shown as incremented integer values.) Each row also preferably includes both the postal code abbreviation ("abbr_name") and full name ("name") for individual ones of those states.

An "envelope" column contains the envelope, or bounding box, associated with the geometry represented by the "polygon" column . (The polygon column represents the boundary of this state, and the envelope column provides a bounding box for that boundary.) Spatially-enabled database systems provide built-in functions for generating a bounding box for a particular geometry object. The "ST_Envelope" function of Spatial Extender, for example, may be used to generate a best-guess approximation of a bounding box. The resulting bounding box is a rectangle, and the bounding box returned by ST_Envelope is denoted by two points which correspond to the lower left and upper right coordinates of this rectangle. The polygon column may contain a number of <x,y> coordinates, and thus it should be understood that the "(p,p,p,p)" representation in the sample rows is merely for purposes of illustration. Preferred embodiments of the related inventions store the polygon as a geometric data type.

City table 430 includes a row for each city which has an entry in the address table 500. Each row includes a unique index ("city_id" in the example). A "state_id" column provides a pointer or reference (known as a foreign key in relational database systems), referring to the record in the state table which corresponds to this city. Thus, the first four rows of table 430 indicate that these cities are in North Carolina (having a "state_id" value of "1"; see the first row of table 400), and the fifth row of table 430 indicates that this city is in South Carolina (having a "state_id" value of "2"). Each row of city table 430 also preferably contains a textual "name" column, having the city name, and an "envelope" column and "polygon" column. The envelope column stores a bounding box corresponding to the boundary of the city (as described by it's polygon value). The envelope and polygon columns are analogous to those which have been described for state stable 400.

Zip code table 460 includes a row for each zip code which has an entry in the address table 500. Each row includes a unique index ("zip_id" in the example) for the zip code which is itself stored in this row (in textual form in the column which, in this example, is named "zipcode"), and preferably includes foreign key references to records in the city table and state table (using the "city_id" and "state_id" columns, respectively). Each zip code row therefore identifies the city and state in which this zip code is located. Thus, the first row of zip code table 460 indicates that the zip code "27502" is in Apex, N.C. (having a "city_id" of "3" and a "state_id" value of "1"; see the third row of table 430 and the first row of table 400, respectively). Preferably, each row of zip code table 460 also contains an "envelope" column and "polygon" column. The envelope column stores a bounding box corresponding to the boundary of the zip code (as described by it's polygon value). The envelope and polygon columns are analogous to those which have been described for state stable 400.

The records in address table 500 of FIG. 5 are constructed while processing the records of a textual input file, as described in detail in the related inventions. (Address table 500 corresponds to address table 240 of FIG. 2.) The columns of address table 500 will now be described.

Each record in address table 500 has a unique index or key value ("addr_id" in this example). In preferred embodiments of the related inventions, the full street address is stored in a column ("address" in this example) of the address table, in text format. A "street_id" column provides a pointer or reference which refers to a record in the street table 530. (This pointer provides a link between the address record in table 500 and the geometry data for the corresponding street. Preferably, this value is an alternate key whose value is unique in each row.) The "city", "state", and "zipcode" columns of address table 500 preferably store a textual representation of the city name, state name, and zip code associated with this address. Optionally, the key value corresponding to the values in one or more of these columns may be stored in addition to, or instead of, the textual values. Considerations in the choice of storage representation for these values includes anticipated use of the data mart.

The last column of address table 500, designated as "PT<x,y>", contains latitude and longitude values in preferred embodiments of the related inventions, and values in this column are stored as geometric data. One manner in which these values may be obtained and added to the data in the input records (such as records 310, 320, 330 of FIG. 3) when constructing table 500 is described in the related inventions. (Note that conventional latitude and longitude values may in some cases be expressed using negative numbers. For performance gains, spatially-enabled databases typically apply an offset factor such that all latitude and longitude values are stored as positive numbers. This distinction is not pertinent to an understanding of the present invention, and thus references herein to storing latitude and longitude should be interpreted as including this offset form.)

Street table 530 contains street geometry data, and table 530 corresponds to street table 250 in the data mart schema representation in FIG. 2. Values in the rows of street table 530 are created while processing the input table, as described in the related inventions. The sample values in the three rows of street table 530 represent the three sample rows of address table 500. (In an actual spatially-enabled database, address table 500 may contain many more rows than street table 530.) Each row of street table 530 begins with a key ("street_id" in this example) that refers to the street_id column of address table 500. The starting point ("start_Pt") for each street is preferably stored as a column of the street table, using an <x,y> coordinate representation of the latitude and longitude where (for purposes of the set of data in this database) this street begins. The street name is preferably stored in text form within each record (in the column "name", in this example). Each row also preferably contains an "envelope" column and a "linestring" column, where the envelope column stores a bounding box corresponding to the path taken by this street The value of the envelope column is created in a manner that is analogous to that which has been described for the envelope column of the state table 400, by invoking the ST_Envelope function with the street's linestring as an input parameter.

The last column of street table 530, designated as "Point_ZM", is a 4-dimensional value. As discussed earlier, 3-dimensional and 4-dimensional extensions have been defined for the WKT and WKB formats, and the Point_ZM form <x,y,z,m> corresponds to this 4-dimensional extension. According to preferred embodiments of the related inventions, the values of these 4 dimensions are used in a novel way to provide a compact technique for storing information about the corresponding street. Prior art uses for these four dimensions provide a latitude, longitude, elevation/depth, and measure/distance value. (As stated earlier, values which result after applying an offset may be stored in these dimensions, rather than actual values, but that distinction is not pertinent to the present discussion.) As defined by the related inventions,

- the first dimension of Point_ZM entries in table 530 stores a state_id value, which provides a reference to the state table (see table 400 of FIG. 4);
- the second dimension stores a city_id value, providing a reference to the city table (see table 430 of FIG. 4);
- the third dimension stores a zip_id value, providing a reference to the zip code table (see table 460 of FIG. 4); and
- the fourth dimension stores a density value, representing the density of addresses on this particular street.

In an alternative embodiment of the related inventions, the fourth dimension may be omitted, and the novel interpretation of the remaining three dimensions may be used. Furthermore, for locations which are not identified by a state, city, and zip code (such as non-United States addresses), the postal code equivalent or equivalent geographical location descriptors may be substituted for the values of these dimensions. (Similarly, the state and zip code tables may be replaced by tables containing other location descriptors, and the corresponding columns in other tables may be similarly adapted, as will be obvious.)

The value of the starting point, envelope, linestring, and Point ZM columns are computed while processing the input file, as described in the related inventions.

The intersection table 560 in FIG. 5 generated according to the related inventions stores information about intersections of streets. This table 560 corresponds to table 210 in FIG. 2. A technique for generating the rows of table 560 is described in the related inventions. This intersection table is used by preferred embodiments of the present invention; see the discussion of FIGS. 6 and 7 (comprising FIGS. 7A–7J), below.

In preferred embodiments of the related and present inventions, each record in intersection table 560 has a unique key "inter_id", and a "street_id" column which contains a reference to an entry in the address table 500. Thus, the record stores the intersections for that particular street Additional columns in the intersection table 560 are "intersect_id" and "intersect_pt". In preferred embodiments of the related and present inventions, the intersect_id column stores a comma-separated list of text string values (where these values identify other street records in the street table—namely, the street records for those streets that intersect the street identified by street_id) and the intersect_pt column stores a list of <x,y> points representing the location of each of the intersections. Thus, in the example, the first row indicates that High House Rd (having street_id "123"; see street table 530) has an intersection with Hudson Rd (having street_id "456"), and this intersection is located at <35.66, 78.92>. Storing the identification of intersecting streets in the intersection table in text form enables very fast look-up operations, such as those described in the present invention. Preferably, the Text Extender feature of DB2 is used, such that this text data can be searched with a linguistic matching operation. (Refer to "DB2 Text Extender Administration and Programming", Version 5.2 (1996, 1998), published by IBM, for more information about Text Extender.)

Turning now to the flowchart in FIG. 6, logic which may be used to implement a preferred embodiment of the present invention will now be described. FIGS. 7A–7J provide representations of sample data which are used to illustrate evaluation of this logic.

Figure 6:
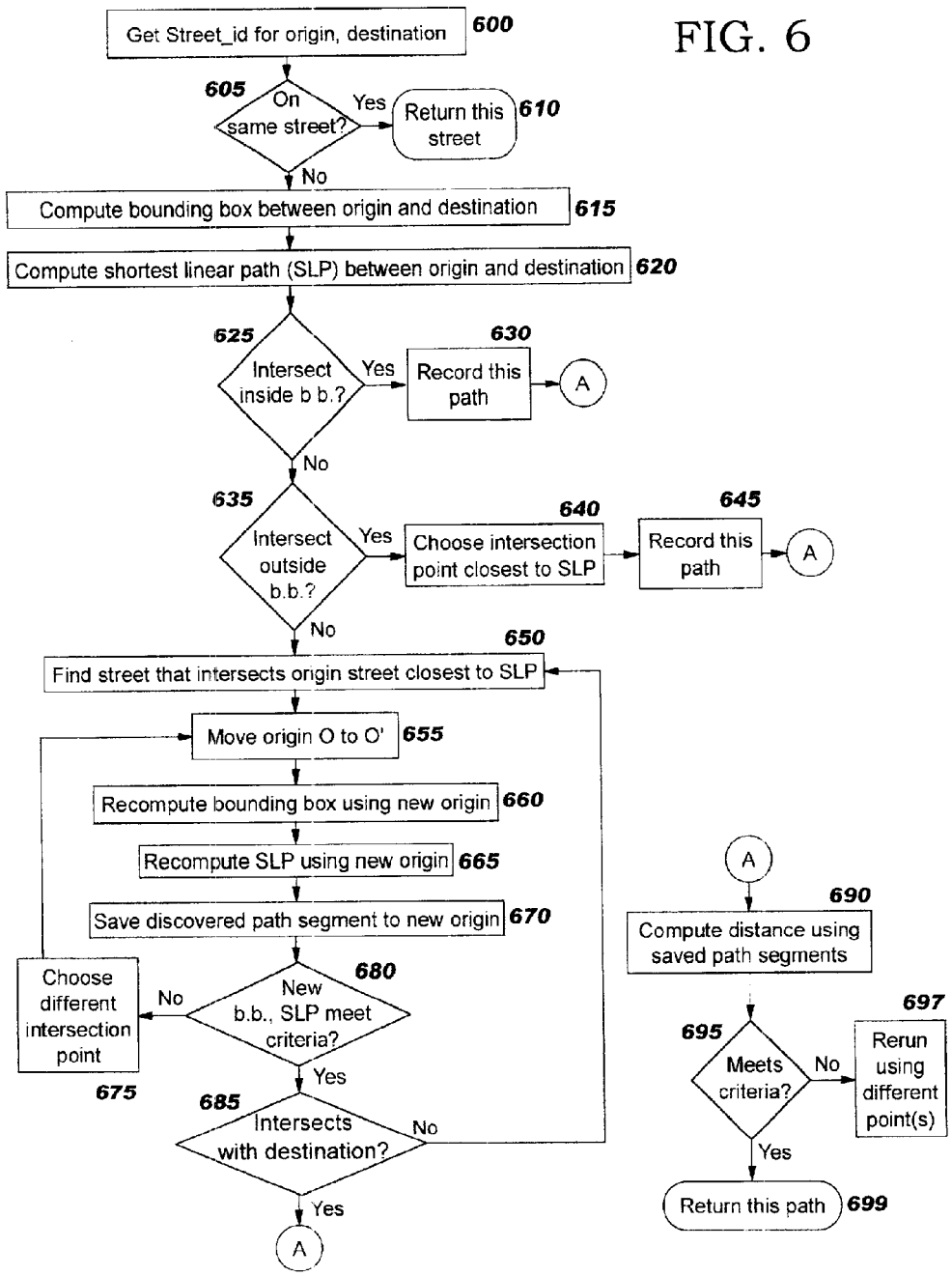
FIG. 6 provides a flowchart which illustrates logic that may be used to implement preferred embodiments of the present invention.

FIG. 6 provides logic which may be used to programmatically calculate a path between two points, using a spatially-enabled database which has been created according to the related inventions. In preferred embodiments, this path represents directions from an origin point "O" to a destination point "D". The process begins at Block 600, where street identifiers ("street_id") for the origin and destination points are obtained. These identifiers may be obtained in several different ways, without deviating from the scope of the present invention.

As one example, if the origin and destination points are described using their textual address information, then address table 500 may be consulted using this textual information. As disclosed in the related inventions, an index may be computed over the combination of the "address", "city", "state", and "zipcode" columns of the address table; thus, the textual origin and destination addresses may be used to consult this index, thereby locating the corresponding row of the address table.

As another example, if the origin and destination addresses are described using their (x,y) coordinates, then these values may be used to search the "PT<x,y>" column of the address table to locate the corresponding row. As discussed in the related inventions, this type of search may comprise using a built-in generic comparison function provided by the database system. Suppose the origin address has (x,y) coordinates of (35.9,78.2). The following syntax may then be used to consult the sample address table 500, locating the row for address "123 High House Rd":

Address.PT<x,y>=db2gse.ST_Point(35.9 78.2, db2gse.coordref..( )srid(0))

Figure 7A:
FIGS. 7A–7J depict example scenarios which are used to illustrate operation of the logic in FIG. 6.
Figure 7B:

Once the row in the address table has been located, the value of the "street_id" column is extracted. Block 605 then checks to see if both the origin and destination addresses are on the same street. In preferred embodiments, this test comprises determining whether the extracted "street_id" values are identical. If so, then this street is returned as the path between the origin and destination (Block 610), and the processing of FIG. 6 ends for this invocation. This case is represented by FIGS. 7A and 7B. As can be seen by inspection, it is not necessary to perform further computations when O and D are located on the same street.

Note that preferred embodiments of the related inventions compute the values of the "street_id" column in street table 530 by hashing a combination of the street name and zip code. Thus, if a street spans more than one zip code, it will have distinct rows in the street table for each such zip code and distinct "street_id" values corresponding to those rows. To account for this case, if the processing of Block 605 does not locate identical "street_id" values, the processing preferably also comprises using the "street_id" values which were extracted from the address table (for both the origin and destination points) to access the street table. The value of the "name" column from the two rows of the street table can then be compared, and if the "name" values are identical, this street is returned (Block 610) as the path between the origin and destination.

If the addresses are not located on the same set, then processing reaches Block 615. Block 615 computes a bounding box between the origin point and destination point (Note that if the input provided to FIG. 6 is textual representations of O and D, rather than their <x,y> coordinates, then the coordinate values are preferably obtained by extracting the "PT<x,y>" values from the address table row which was located by Block 600 to find the "street_id" value.)

Figure 7C:
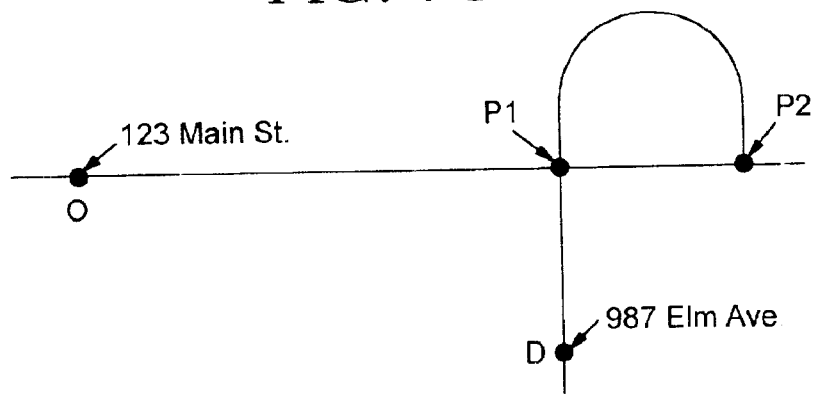
Figure 7D:
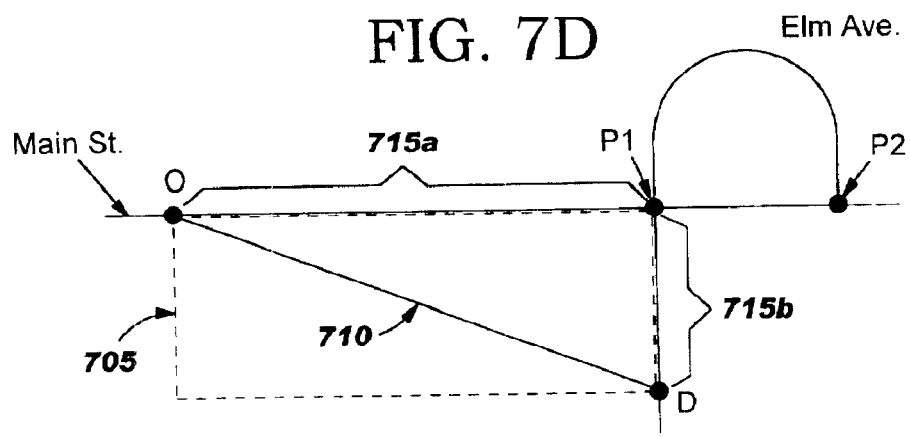
Figure 7E:
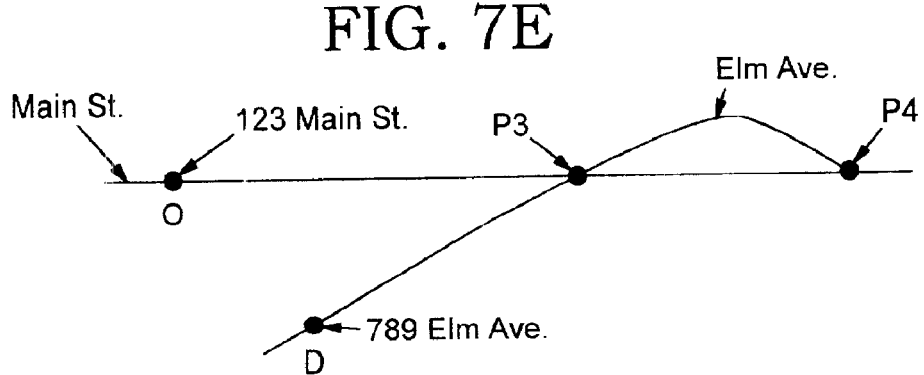
Figure 7F:
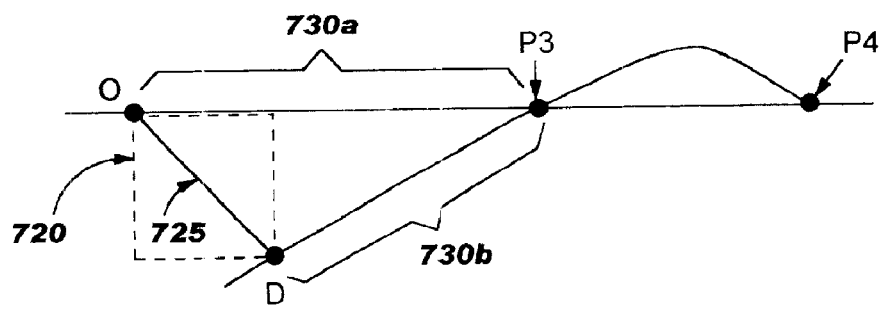
Figure 7G:
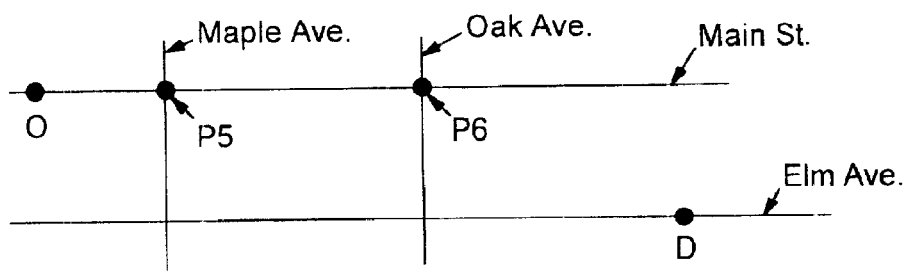

Referring now to the example points in FIG. 7C, suppose the origin address O is "123 Main St." and the destination address D is "987 Elm Ave.". (The city, state, and zip code portions of the address are not deemed necessary to an understanding of the examples, and thus will not be discussed.) As shown in this example, Main St. and Elm Ave. intersect at two locations, first at a point "P1" and then at a point "P2". FIG. 7D shows a bounding box 705 created using the (x,y) coordinates of the origin and destination addresses. (As discussed above, the "ST_Envelope" function is used in preferred embodiments to generate the bounding box.) For this example, the streets on which the two addresses are located are co-linear with sides of the bounding box. (For purposes of better illustrating the bounding boxes in FIG. 7, those boxes have been represented using dashed lines which are slightly inset from the actual location of the sides of the bounding box.)

Returning now to the discussion of FIG. 6, Block 620 computes the shortest linear path (hereinafter, "SLP") between the origin and destination points. The SLP for the example in FIG. 7D is shown at 710. In preferred embodiments, the SLP may be computed by invoking a built-in function such as "ST_LineFromText". Assuming that the origin point O is located at coordinates (10,20) and the destination point D is located at (30,5), where these coordinates are expressed as text values, the following invocation can be used to compute the SLP:

(db2gse.ST_LineFromText ('linestring (10 20, 30 5)', db2gse.coordref( )..srid(0))) (If the coordinates are not in textual form, then another built-in function may be used, such as "ST_LineFromWKB", which uses WKB representations as input.)

Block 625 then checks to see if the streets on which the origin and destination points are located intersect one another, and whether this intersection is within the bounding box. Determining the points of intersection is facilitated by the intersection table 530, which was created according to the related inventions. Thus, the street_id associated with the origin address can be used to search the "street_id" column of the intersection table, thereby locating the intersection row for the origin point's street. The "intersect_id" column of this row is then inspected to determine whether the "street_id" value corresponding to the destination address is located therein. If it is, then there is at least one intersection between the streets on which the origin and destination points are located. (Conversely, the street_id associated with the destination address can be used to search the table, and when the matching row is located, it can be inspected for occurrence of the street_id associated with the origin address.)

Preferably, the "intersect_id" column is scanned to locate all entries for the destination point's "street_id" value. Referring again to the example in FIG. 7D, since there are two points of intersection (P1 and P2) between Main St. and Elm Ave., the intersection row for Main St. would have two entries in the "intersect_id" column (and also in the "intersect_pt" column) for Elm Ave. Only one of these points (P1) is within the bounding box, however. Thus, the test in Block 625 is true for point P1. Control therefore transfers to Block 630, which records the path segments from the origin to P1 and from P1 to the destination as comprising the computed path. In the example of FIG. 7D, this path is shown as 715a, 715b. Control then transfers to Block 690, which is described below.

When the test in Block 625 has a negative result for all of the points of intersection, processing continues at Block 635, which tests to see if there is an intersection point between the origin and destination which is located outside the bounding box. Referring now to the example in FIG. 7E, suppose that Main St. and Elm Ave. intersect at points P3 and P4, but that the streets have no intersections which are at a right angle. The bounding box computed using the origin and destination will then be as shown at 720 in FIG. 7F (with an SLP as shown at 725). Thus, while there are still two points P3 and P4 where the two sets intersect, neither point is located within the bounding box 720. The test in Block 635 accounts for this example scenario, and thus has a positive result. Therefore, control transfers to Block 640 when evaluating FIG. 7F.

Block 640 chooses the intersection point closest to the SLP. A built-in function can be used to determine which point is closest to a line segment. For example, a built-in function such as "ST_Distance" may be invoked to determine the distance from an intersection point to the SLP. This function is preferably invoked for each located intersection point, and the one having the shortest distance is selected. In the example scenario in FIG. 7F, the closest point to SLP 725 is P3. Therefore, according to preferred embodiments, the path segments 730a, 730b which pass through point P3 are recorded (Block 645) as the computed path, and processing then continues at Block 690.

Note that while preferred embodiments are described as using an intersection table created according to the related inventions, the intersection table is not strictly required by an implementation of the present invention. Intersection information which is created using alternative means, and which conveys the information described herein, may be substituted without deviating from the scope of the present invention. References herein to using the intersection table arc therefore intended to include this alternative.

Figure 7H:
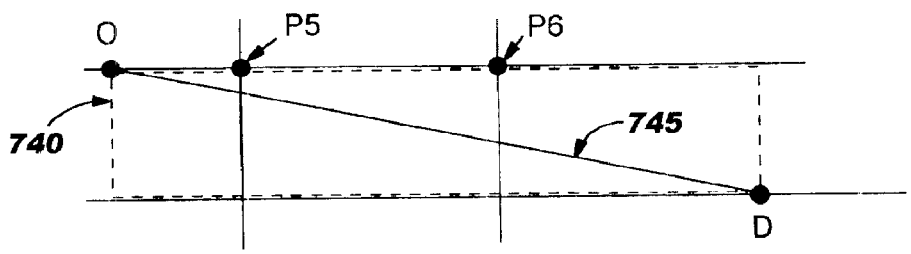

Block 650 is reached when the two streets currently being evaluated have no points of intersection recorded in the intersection table. In Block 650, the street that intersects O's street nearest to the SLP is determined. As described above, a built-in function such as "ST_Distance" may be invoked to determine the distance from an intersection point to the SLP. This function is then invoked for each located intersection point, and the one having the shortest distance is selected by Block 650. An example is provided in FIG. 7G to illustrate this scenario. As depicted therein, Main St. has intersections with Maple Ave. (at "P5") and Oak Ave. (at "P6"). FIG. 7H shows the bounding box 740 and SLP 745 for the example in FIG. 7G. By inspection, it can be seen that the point "P5" where Main St. intersects Maple Ave. is closer to SLP 745 than is point "P6" where Main St. intersects Oak Ave. Thus, P5 is selected by Block 650.

Figure 7I:
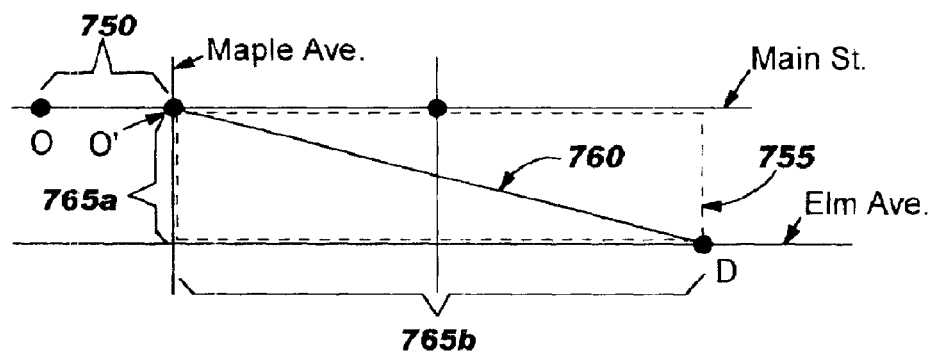
Figure 7J:
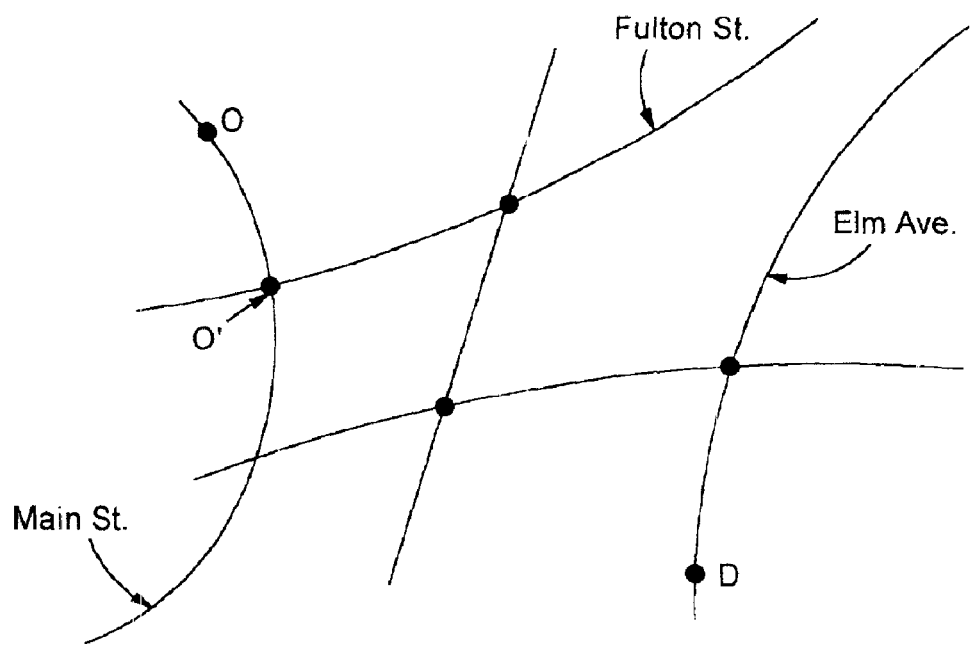

Block 655 moves the point of origin to the point selected in Block 650. This new origin point is referred to as "O'" (i.e. "O prime") in FIG. 6, whereas (in the first iteration through this logic) "O" designates the original origin point. (In subsequent iterations, as will be obvious, O represents the current, previously-selected origin point and O' represents the newly-selected origin point.) See FIG. 7I. Block 660 then computes a new bounding box, using this new origin point, and Block 665 computes a new SLP between this new origin point and the destination point. Block 670 saves the path segment between the previous origin point, O, and the new origin point, O'. Referring to FIG. 7I, the bounding box 755 and SLP 760 correspond to the new origin point O' and destination point "D". Path segment 750 is the segment saved in Block 670.

The test in Block 680 represents an optimization performed by preferred embodiments when computing a path according to the present invention. This test checks to see if the new bounding box and new SLP meet certain criteria. In preferred embodiments, the first of these criteria comprises determining, whether the area of the new bounding box is greater than some particular threshold value, where this threshold value is preferably provided as a modifiable heuristic. (For example, a user may be asked to supply a value for the threshold, or the value may be retrieved from a repository such as a configuration file.) The second criteria preferably comprises determining whether the new SLP is more than some percentage longer (such as 25 percent, for example) than the previous SLP. These criteria may be useful, for example, to avoid selecting path segments that extend in the wrong direction.

If the criteria tested in Block 680 are not met (that is, the new bounding box is too large and/or the new SLP is too long), and if there are one or more additional intersection points from which an alternative new origin point might be selected, then control transfers to Block 675, which chooses a different point. Preferably, the point selected is the one which is next closest to the current SLP. (For example, with reference to FIG. 7H, point P6 would be selected if point P5 failed to meet the criteria tested in Block 680.) Control then returns to Block 655 to begin evaluating this new origin point. (To avoid an infinite loop, all candidate values for 0 are preferably stored in a buffer, and a new candidate is selected from this buffer. If none of the intersection points meets the criteria described above, then the best of the candidates in the buffer should be chosen.)

When the criteria tested at Block 680 are met, then control reaches Block 685, which tests to see if the street on which the new origin point O' lies inter sets the street on which the destination point D is located. Preferred embodiments use the "street_id" value for the destination street to locate its matching row in the intersection table, if that row has not yet been located (see the discussion of Block 625, above). This row is then inspected to determine whether the new origin point's street has an entry in the "intersect_id" column; if so, then these are intersecting streets, and the test in Block 685 has a positive result. (Alternatively, the street_id for the street on which origin point O' is located may be used to search the intersection table to find the matching row, and the values of the "intersect_id" column may be inspected to see if the street_id for D's street is contained therein.)

If the test in Block 685 has a positive result, then the path segment from the current origin to the point of intersection, and the path segment from the point of intersection to D, form the end of the calculated path, and processing continues at Block 690; otherwise, the path to the destination is not yet complete, and control returns to Block 650 to begin locating the next segment on the path.

With reference to the example in FIG. 7I, Block 685 will have a positive result on this iteration, since Maple Ave. intersects Elm. Ave. Thus, the complete computed path is represented by segments 750, 765a, and 765b. On the other hand, given the map in FIG. 7J, the path is not yet complete after selecting a single new origin O', because the street on which O' is located (Fulton St., in the example) does not intersect the street on which D is located (Elm Ave.). Thus, additional iterations through the logic of FIG. 6 will be performed by returning control to Block 650.

Upon reaching Block 690, a complete path between original origin O and destination D has been determined. Block 690 then computes the distance (i.e. length) of this path by adding the lengths of the path segments. Block 695 compares this computed distance to the length of the original SLP (which represents the linear distance between the actual origin and destination points). If the computed path length exceeds the length of the original SLP by a particular factor, then the path computation process of FIG. 6 is preferably re-executed using intermediate points other than those which were selected in this iteration (as indicated at Block 697), provided that at least one other intermediate point is available. The factor which is applied in Block 695 may be fixed or modifiable, and may be supplied in a similar manner to that described above with reference to the criteria used in Block 680. As one example, a factor of 250 percent may be used, such that computed paths which are more than 2.5 times as long as the linear distance between the origin and destination will result in repeating the path calculation process.

When the computed path length is within the bounds tolerated by the factor applied in Block 695, then this path is returned (Block 699) as the selected path between the origin and destination points.

It should be noted that the operation performed in Block 695 is an optimization technique, and thus this operation may be omitted without deviating from the scope of the present invention. Alternatively, different optimization criteria may be applied in an attempt to select a path which is preferred under those different criteria For example, a path which results in a minimal number of turning points might be computed. Or, a path which gives preference to highways over city roads might be selected.

Figure 8:
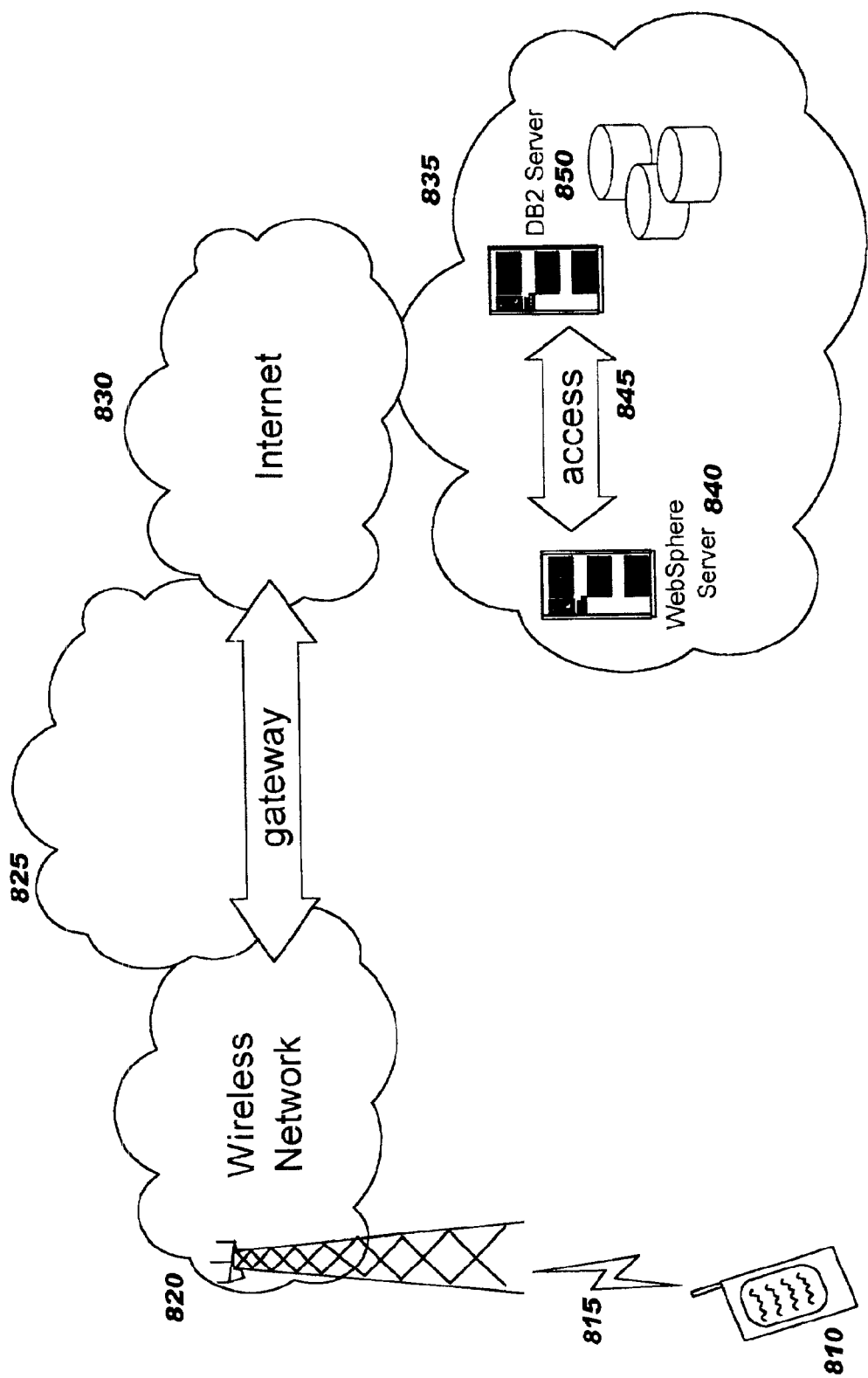
FIG. 8 illustrates a sample networking environment in which the present invention may be used.

A FIG. 8 illustrates a sample networking environment in which the present invention may be used advantageously. As shown therein, a user of a handheld computing device 810 may request driving directions (or other types of directions or another type of path, equivalently) by interacting with an application program that implements of the present invention, where this program operates on the server side of the networking environment. For example, the handheld computing device 810 may establish a wireless connection 815 into a wireless network 820, where this path then passes through a wireless-to-wired gateway or network 825 and then through the Internet 830. The connection may then enter an intranet 835 which contains an application server 840 from which the application is served. In the sample environment of FIG. 8, the application server 840 is illustrated as a WebSphere® server from IBM. Suppose device 810 hosts a query application which establishes a connection to a Java™ servlet executing on application server 840. For example, a user of device 810 might request computation of a path from his/her current location to a restaurant serving pizza, where the restaurant is first to be located by performing a search of all pizza restaurants within a one mile radius of this current location. (One type of information that might be stored in points of interest table 270 is names of restaurants and the type of food they serve. The built-in "ST_Buffer" function may be used to determine the one miles of a geographical point.) Upon receiving the user's request, application server 840 may forward 845 a request to DB2 server 850, which may store a spatially-enabled database used by the present invention. DB2 server 850 then retrieves data for responding 845 to device 810. The implementation of the present invention, which computes a path to this restaurant, may execute on DB2 server 850, or on another device on which the operations described herein can be carried out. One manner in which the computed path can be delivered to the handheld device 810 is by creating a HyperText Markup Language ("HTML") document containing textual street name information. In addition to, or instead of, this textual information, a graphical depiction may be provided which shows the street segments of the computed path. ("WebSphere" is a registered trademark of IBM. "Java" is a trademark of Sun Microsystems, Inc.

As has been demonstrated, the present invention provides a number of advantages. The disclosed techniques make use of built-in features and functions of relational databases and spatial enablement. Information about intersections between streets is used in a novel manner to compute paths between points. As contrasted to prior art techniques, complex directed graph computations do not need to be coded in an application program to determine the path. In addition, the resource-intensive WKB and ".shp" shape file formats and proprietary EDG file format do not need to be used for determining information about streets or points on the streets. Instead, the disclosed technique offers simplicity, flexibility, and speed.

The disclosed techniques may be used in a wide variety of applications, including e-commerce applications, for server-side rendering of directions and other types of paths. For example, an automotive navigational system may contact an implementation of the present invention over a wireless connection to determine preferred driving directions between two points. Or, a tourist might consult an implementation of the present invention from his/her handheld computing device to determine a preferred walking path from one landmark to another. Many other scenarios may be envisaged once the teachings disclosed herein are known. (Note that references to a "server-side" implementation are for purposes of illustration and not of limitation: the present invention may operate in any device capable of interacting with a relational database, including client-side devices such as handheld computing devices.)

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of programmatically calculating paths comprising steps of:

identifying an origin and a destination;

determining a first street on which the origin is located and a second street on which the destination is located; and computing a path from the origin on the first street to the destination on the second street using intersection data by iteratively performing, until completing the path, steps of:

computing a bounding box between the origin and the destination;

computing a shortest linear path ("SLP") between the origin and the destination; and selecting, from the intersection data when the path is not yet complete, an intersection point closest to the SLP to replace the origin for subsequent iterations of the iteratively performed steps, wherein the path is complete when the street on which the origin is located intersects the street on which the destination is located.

2. The method according to claim 1, wherein the selecting step gives preference to intersection points located within the bounding box.

3. The method according to claim 1, wherein the intersection data is stored in a spatially-enabled table of a spatially-enabled database.

4. The method according to claim 1, wherein the selecting step gives preference to intersection points whose SLP is not longer than a quantified percentage more than the SLP between the origin on the first street and the destination on the second street.

5. The method according to claim 4, wherein the quantified percentage is a value specified by a user.

6. The method according to claim 4, wherein the quantified percentage is a value obtained from a configuration file.

7. The method according to claim 1, wherein the selecting step gives preference to intersection points whose bounding box is no more than a quantified percentage larger than the bounding box between the origin on the first street and the destination on the second street.

8. The method according to claim 7, wherein the quantified percentage is a value specified by a user.

9. The method according to claim 7, wherein the quantified percentage is a value obtained from a configuration file.

10. The method according to claim 1, wherein the selected intersection point is selected from one or more intersection points which are each stored as a point geometry value in a spatially-enabled database.

11. The method according to claim 1, wherein the destination is obtained programmatically from a specification of point of interest.

12. The method according to claim 1, wherein the origin and the destination are each identified with a point geometry value.

13. A system for programmatically calculating paths, comprising:
    means for identifying an origin and a destination;
    means for determining a first street on which the origin is located and a second street on which the destination is located; and
    means for computing a path from the origin on the first street to the destination on the second street using intersection data by iteratively performing, until completing the path, operation of:
        means for computing a bounding box between the origin and the destination;
        means for computing a shortest linear path ("SLP") between the origin and the destination; and
        means for selecting, from the intersection data when the path is not yet complete, an intersection point closest to the SLP to replace the origin for subsequent iterations of the iteratively performed operations,
    wherein the path is complete when the street on which the origin is located intersects the street on which the destination is located.

14. The system according to claim 13, wherein the means for selecting gives preference to intersection points located within the bounding box.

15. The system according to claim 13, wherein the intersection data is stored in a spatially-enabled table of a spatially-enabled database.

16. The system according to claim 13, wherein the means for selecting gives preference to intersection points whose SLP is not longer than a quantified percentage more than the SLP between the origin on the first street and the destination on the second street.

17. The system according to claim 16, wherein the quantified percentage is a value specified by a user.

18. The system according to claim 16, wherein the quantified percentage is a value obtained from a configuration file.

19. The system according to claim 13, wherein the means for selecting gives preference to intersection points whose bounding box is no more than a quantified percentage larger than the bounding box between the origin on the first street and the destination on the second street.

20. The system according to claim 19, wherein the quantified percentage is a value specified by a user.

21. The system according to claim 19, wherein the quantified percentage is a value obtained from a configuration file.

22. The system according to claim 13, wherein the selected intersection point is selected from one or more intersection points which are each stored as a point geometry value in a spatially-enabled database.

23. The system according to claim 13, wherein the destination is obtained programmatically from a specification of point of interest.

24. A computer program product for programmatically calculating paths, the computer program product embodied on one or more computer-readable media and comprising:
    computer-readable program code means for identifying an origin and a destination;
    computer-readable program code means for determining a first street on which the origin is located and a second street on which the destination is located; and
    computer-readable program code means for computing a path from the origin on the first street to the destination on the second street using intersection data by iteratively performing, until completing the path, operation of:
        computer-readable program code means for computing a bounding box between the origin and the destination;
        computer-readable program code, means for computing a shortest linear path ("SLP") between the origin and the destination; and
        computer-readable program code means for selecting, from the intersection data when the path is not yet complete, an intersection point closest to the SLP to replace the origin for subsequent iterations of the iteratively performed operations,
    wherein the path is complete when the street on which the origin is located intersects the street on which the dstination is located.

25. The computer program product according to claim 24, wherein the computer-readable program code means for selecting gives preference to intersection points located within the bounding box.

26. The computer program product according to claim 24, wherein the intersection data is stored in a spatially-enabled table database.

27. The computer program product according to claim 24, wherein the computer-readable program code means for selecting gives preference to intersection points whose SLP is not longer than a quantified percentage more than the SLP between the origin on the first street and the destination on the second street.

28. The computer program product according to claim 27, wherein the quantified percentage is a value specified by a user.

29. The computer program product according to claim 27, wherein the quantified percentage is a value obtained from a configuration file.

30. The computer program product according to claim 24, wherein the computer-readable program code means for selecting gives preference to intersection points whose bounding box is no more than a quantified percentage larger than the bounding box between the origin on the first street and the destination on the second street.

31. The computer program product according to claim 30, wherein the quantified percentage is a value specified by a user.

32. The computer program product according to claim 30, wherein the quantified percentage is a value obtained from a configuration file.

33. The computer program product according to claim 24, wherein the selected intersection point is selected from one or more intersection points which are each stored as a point geometry value in a spatially-enabled database.

34. The computer program product according to claim 24, wherein the destination is obtained programmatically from a specification of point of interest.

* * * * *